(12) United States Patent
Sangameshwara et al.

(10) Patent No.: US 12,206,718 B2
(45) Date of Patent: Jan. 21, 2025

(54) SYSTEM AND METHODS FOR HANDLING IMMERSIVE SERVICE IN IP MULTIMEDIA SUBSYSTEM AND MISSION CRITICAL SERVICES

(71) Applicant: SAMSUNG ELECTRONICS CO., LTD., Suwon-si (KR)

(72) Inventors: Vijay Sangameshwara, Karnataka (IN); Madhusudan Gorur Manjunath, Karnataka (IN); Srinidhi Nagaraja Rao, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 174 days.

(21) Appl. No.: 17/868,312

(22) Filed: Jul. 19, 2022

(65) Prior Publication Data

US 2023/0044527 A1 Feb. 9, 2023

(30) Foreign Application Priority Data

Jul. 20, 2021 (IN) .............................. 202141032656
Jul. 11, 2022 (IN) .............................. 202141032656

(51) Int. Cl.
*H04M 3/00* (2024.01)
*H04L 12/66* (2006.01)
(Continued)

(52) U.S. Cl.
CPC ...... *H04L 65/1104* (2022.05); *H04L 65/1016* (2013.01); *H04L 65/1069* (2013.01); *H04L 65/65* (2022.05)

(58) Field of Classification Search
CPC ......... H04M 2250/02; H04M 1/72412; H04M 1/72415; H04M 1/72409; H04M 3/42042;
(Continued)

(56) References Cited

U.S. PATENT DOCUMENTS

2005/0165913 A1\* 7/2005 Coulombe .............. H04W 4/18
709/219
2006/0239247 A1\* 10/2006 Postmus ............. H04L 65/1101
370/352
(Continued)

FOREIGN PATENT DOCUMENTS

WO 2006/114757 11/2006
WO WO-2006114757 A1 \* 11/2006 ....... H04L 29/06027
WO 2021/029636 2/2021

OTHER PUBLICATIONS

Indian Office Action issued Dec. 21, 2023 in corresponding Indian Patent Application No. 202141032656.
(Continued)

*Primary Examiner* — Kharye Pope
(74) *Attorney, Agent, or Firm* — Nixon & Vanderhye, P.C.

(57) ABSTRACT

The disclosure relates to methods and system for handling immersive services with feature tags in an 3GPP IP multimedia subsystem (IMS) and 3GPP mission critical services (MCX). A user equipment uses the media tags, feature tags with unique IMS communication service identifier (ICSI) and IMS application reference identifier (IARI) to communicate with the IMS network for determining the immersive services in the communication. Accordingly, a method includes: performing, a registration with a network for handling immersive call services based on feature tags included in a session initiation protocol (SIP) REGISTER request; determining whether the network provides a provision for the handling of immersive call services based on an SIP REGISTER response; and sending an SIP INVITE request including feature tags to a second client device via the network based on determining that the network provides the provision of handling immersive media streams. Thus, (Continued)

the immersive call is established by the first client device with the second client device.

20 Claims, 10 Drawing Sheets

(51) Int. Cl.
*H04L 65/1016* (2022.01)
*H04L 65/1069* (2022.01)
*H04L 65/1104* (2022.01)
*H04L 65/65* (2022.01)
*H04M 5/00* (2006.01)

(58) Field of Classification Search
CPC ...... G06F 3/167; G06F 3/0482; G06F 3/0488; G06F 1/163; G06F 3/038; G06F 3/04883; H04L 65/1104; H04L 65/1069; H04L 65/1016; H04L 67/131; H04L 65/403; H04L 2101/385; H04L 69/22; H04L 65/1073; H04L 51/10; H04L 69/24; H04L 67/52; H04L 67/14; H04L 65/1101; H04W 60/00; H04W 80/10; G06T 19/006; G06T 15/20; G06T 2200/24; G06T 15/00; G06T 2200/16

See application file for complete search history.

(56) References Cited

U.S. PATENT DOCUMENTS

| | | | |
|---|---|---|---|
| 2015/0043429 A1* | 2/2015 | Kim | H04L 67/52 370/328 |
| 2017/0171814 A1* | 6/2017 | Belghoul | H04W 4/90 |
| 2017/0251029 A1* | 8/2017 | Atarius | H04W 8/18 |
| 2017/0272838 A1* | 9/2017 | Glazer | G06F 3/012 |
| 2018/0062691 A1* | 3/2018 | Barnett, Jr. | G06F 3/167 |
| 2018/0113669 A1* | 4/2018 | Szeto | G06F 3/04815 |
| 2018/0176876 A1* | 6/2018 | Alam | H04W 60/00 |
| 2019/0014613 A1* | 1/2019 | Antsev | H04M 1/72463 |
| 2021/0360040 A1* | 11/2021 | Abdelmalek | H04L 65/1069 |
| 2023/0007053 A1* | 1/2023 | Naik | H04L 65/1104 |
| 2023/0007706 A1* | 1/2023 | Dahlqvist | H04L 65/40 |
| 2024/0022619 A1* | 1/2024 | Liu | H04L 65/1063 |

OTHER PUBLICATIONS

3GPP TR 26.928 V16.1.0, Technical Specification Group Services and System Aspects; Extended Reality (XR) in 5G, Dec. 1, 2020, 130 pages.

* cited by examiner

SYSTEM AND METHODS FOR HANDLING IMMERSIVE SERVICE IN IP MULTIMEDIA SUBSYSTEM AND MISSION CRITICAL SERVICES

CROSS REFERENCE TO RELATED APPLICATIONS

This application is based on and claims priority under 35 U.S.C. § 119 to Indian Provisional Patent Application Serial No. 202141032656 (PS), filed on Jul. 20, 2021, in the Indian Patent Office, and to Indian Complete Patent Application Serial No. 202141032656 (CS), filed on Jul. 11, 2022, in the Indian Patent Office, the disclosures of which are incorporated by reference herein in their entireties.

BACKGROUND

Field

The disclosure relates to an immersive technology. For example, the disclosure relates to handling immersive services in third generation partnership project (3GPP) internet protocol (IP) multimedia subsystem (IMS) and 3GPP mission critical services (MCX).

Description of Related Art

Deployment of augmented reality in telecommunications, businesses can find solutions for multiple maintenance challenges Immersive services technologies such as hologram, augmented reality and virtual reality may add advantage by simplifying and speeding up the entire inspection process. Similarly, immersive services can streamline multiple business procedures such as employee training and field service management. Additionally, immersive technologies offer a hands-free and interactive medium to business leaders and employees for engaging with enterprise systems. Due to these benefits, telecom businesses are interested in adopting augmented reality and virtual reality.

IP IMS has become the core component within third generation (3G), fourth generation (4G) and next generation telecom networks. IMS technology defined by 3GPP standards assisted core network evolution from circuit-switching to packet-switching for delivering telephony services like calls, messaging etc. IMS is an IP multimedia system designed to assist mobile operators deliver next generation interactive and interoperable services, cost-effectively, over an architecture providing the flexibility of the Internet.

At present, the fifth generation (5G) technology standard for broadband cellular networks, successor of 4G is being deployed by telecom companies worldwide. The international telecommunication union radiocommunication (ITU-R) has defined three main application areas for the enhanced capabilities of 5G. They are enhanced mobile broadband (eMBB), ultra reliable low latency communications (URLLC), and massive machine type communications (mMTC). Communication services under enhanced mobile broadband application area include immersive services such as holographic services, augmented reality (AR)/virtual reality (VR) services etc. that are expected to take user experience to next level alongside voice and video calls. Wherein holographic calls unleash life-size interaction with your caller and extended reality (XR) calls (AR/VR) taking user experience to virtual world along with your caller.

3GPP TR 26.298 "Technical Specification Group Services and System Aspects; Extended Reality (XR) in 5G" under section 6.2.8 "XR conversational" stated these services are an extension on the current MTSI work, using the IMS for session signaling. To, support XR conversational services (in 5G), extensions are needed in the signaling to enable VR/AR specific attributes, and the media and metadata need to support the right codecs, profiles and metadata". Latest IMS specification "3GPP 24.229: IP multimedia call control protocol based on session initiation protocol (SIP) and session description protocol (SDP)", are yet to provide extension or solution to identify and handle immersive services like holographic services, XR services in core network and UE.

Accordingly, neither 3GPP IMS nor 3GPP MCX provides a system or a method to identify and handle Immersive Services which are potential services utilizing enhanced mobile brand aspect of 5G. Below use cases as presented in 3GPP TR 26.928 Technical Specification Group Services and System Aspects; Extended Reality (XR) in 5G clearly shows the lack of support in the current-state of art system.
  identifying incoming call as holographic call, AR/VR call;
  identifying the application or paired devices to handle the immersive media content. Unlike voice/video calls which are realized with in mobile, immersive services requires usage of "wearables" "Holographic projectors" paired with user mobile.

Thus, the existing technologies/present state of art does not provide solution for at least identifying call as holographic call, AR/VR calls in 3GPP IMS network or 3GPP MCX network for call routing, bandwidth reservation etc. Identifying the application or paired devices to handle the immersive media content at user side.

Therefore, there is a need for a solution to overcome the shortcomings mentioned above.

SUMMARY

Embodiments of the disclosure provide a method for handling immersive services. The method, according to an example embodiment, includes: performing, by a first client device of a plurality of client devices, a registration with a network for handling immersive call services based on a plurality of feature tags included in a session initiation protocol (SIP) REGISTER request; determining whether the network provides a provision for the handling of immersive call services based on an SIP REGISTER response; sending, by the first client device, an SIP INVITE request including the plurality of feature tags to a second client device of the plurality of client devices via the network based on determining that the network provides the provision of handling immersive media streams; and establishing the immersive call by the first client device with the second client device based on an acceptance of the SIP INVITE request by the second client device.

To further illustrate various advantages and features of the present disclosure, a more particular description will be rendered by reference to various example embodiments thereof, which is illustrated in the appended drawings. It is appreciated that these drawings depict example embodiments of the disclosure and are therefore not to be considered limiting its scope. The disclosure will be described and explained with additional specificity and detail with the accompanying drawings.

BRIEF DESCRIPTION OF THE DRAWINGS

The above and other aspects, features and advantages of the certain embodiments of the present disclosure will be more apparent from the following detailed description, taken in conjunction with the accompanying drawings in which.

Figure 1A:
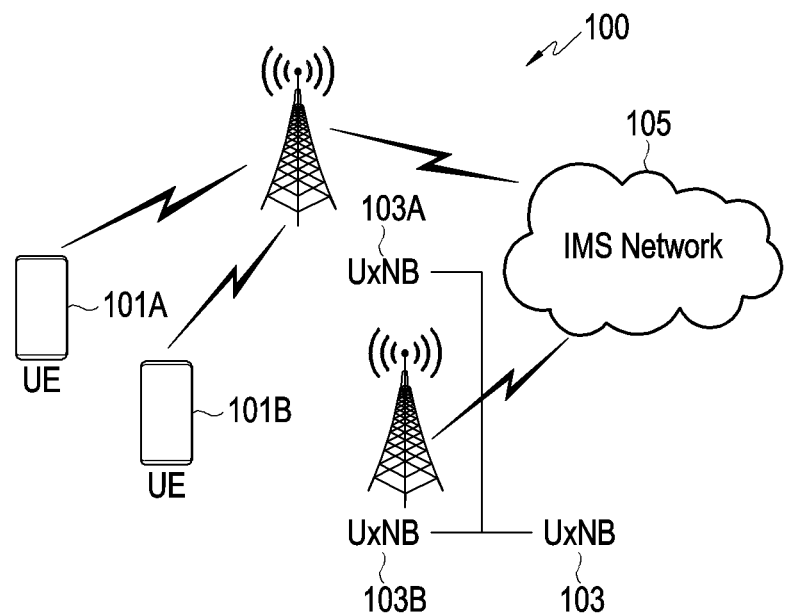
FIGS. 1A and 1B are diagrams illustrating an example communication system, according to various embodiments.

Further, skilled artisans will appreciate that elements in the drawings are illustrated for simplicity and may not have necessarily been drawn to scale. For example, the flowcharts illustrate a method in terms operations involved to help to improve understanding of aspects of the present disclosure. Furthermore, in terms of the construction of the device, one or more components of the device may have been represented in the drawings by conventional symbols, and the drawings may show specific details for understanding the various example embodiments of the present disclosure and to not obscure the drawings with details that will be readily apparent to those of ordinary skill in the art having the benefit of the description herein.

DETAILED DESCRIPTION

It should be understood at the outset that although illustrative implementations of the various example embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the appended claims along with their full scope of equivalents.

The term "some" as used herein may include "none, or one, or more than one, or all." Accordingly, the terms "none," "one," "more than one," "more than one, but not all" or "all" would all fall under the definition of "some." The term "some embodiments" may refer to no embodiments or one embodiment or several embodiments or all embodiments. Accordingly, the term "some embodiments" is defined as meaning "one embodiment, or more than one embodiment, or all embodiments."

The terminology and structure employed herein are for describing, teaching, and illuminating various embodiments and their specific features and elements and do not limit, restrict, or reduce the spirit and scope of the claims or their equivalents.

For example, any terms used herein such as but not limited to "includes," "comprises," "has," "have," and grammatical variants thereof do not specify an exact limitation or restriction and certainly do not exclude the possible addition of one or more features or elements, unless otherwise stated, and should not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" "a plurality of" feature or element do NOT preclude there being none of that feature or element unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skill in the art.

Embodiments of the present disclosure will be described in greater detail below with reference to the accompanying drawings.

According to an embodiment the present disclosure discloses methods and a system for handling immersive services using media tags and feature tags in an IP multimedia subsystem (IMS) and mission critical services (MCX). A user equipment (UE) uses the feature tags with unique IMS communication service identifiers (ICSI) and IMS application reference identifiers (IARI) to communicate with the IMS network for determining and processing the immersive services in the communication and SIP Media tags to register their capability to handle Hologram and XR media content.

Figure 1B:
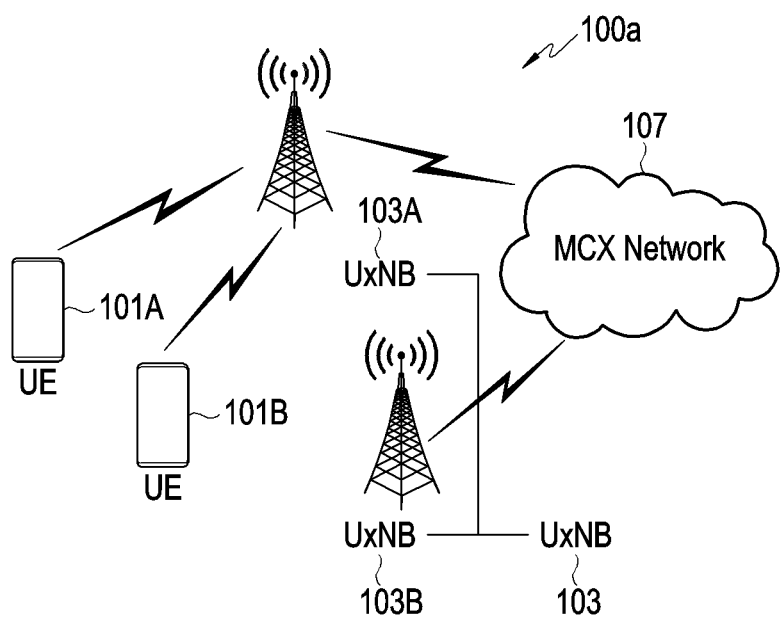

FIGS. 1A and 1B are diagrams illustrating illustrates an example communication system 100, according to various embodiments. For example, FIG. 1A illustrates a communication system 100a comprising user equipments (UEs) 101A and 101B acting as client devices are in communication with the IMS network 105 via the UxNBs 103 (e.g., including UxNBs 103A, 103B). According to an embodiment the UxNBs 103 acts as a radio access node or a base station may be one of eNB/gNB/ng-eNB and the like. In the similar manner FIG. 1B illustrates a communication system 100a of UEs 101A and 101B acting as client devices are in communication with the MCX network 107 via the UxNBs 103. In an example, the UE's may be combinedly referred as a client devices thorough out the disclosure without deviating from the scope of the disclosure.

According to an embodiment, for handling various immersive services for example hologram call, augmented reality (AR) call or a virtual reality (VR) call by any of client devices over any network e.g., either IMS or the MCX network, various features tags have been included in the communication protocols. According to a unique aspect of the present disclosure for handling immersive contents like Hologram, XR (AR, VR, mixed reality (MR)) following features tags was introduced.

As an example in SIP media tags: sip.hologram, sip.xr, was introduced as per RFC 3480 on same lines for audio and video and proposal to NG.114-IMS Profile for Voice, Video and Messaging over 5GS. Thus, whenever said tags with a particular extension was received by the network (IMS or MCX), then the network understands that the client devices support said type of media type. For example, if the network receives "sip.hologram" tag during IMS registration procedure, then the network understands that the said client device supports hologram as a streaming media type for immersive service. According to an embodiment of the present disclosure, a first feature tags is indicative of at least one of a type of immersive media streams that is supported by the plurality of the client devices. As an example, a first feature tags may include SIP media tags: sip.hologram, sip.xr.

According to a further example, table 1 below represents IMS Communication Service Identifiers (ICSI), IMS Application Reference Identifier (IARI). In particular, table 1 includes a second feature tags that are indicative of an intended type of immersive call services for an initiated immersive call by the client device for making the immersive call with another client device.

Further, during the establishment of the call, the SIP register may include the first features tags and the second features tags and when the call is being initiated by the client device the SIP INVITE may include only those features tags that are associated with the intended immersive services. For example, if the client device calls another client device to make a hologram call then feature tags related to hologram will be sent in the SIP INVITE. Thus, such feature tags are referred as second feature tags throughout the disclosure. A detailed explanation of the same is made in the upcoming paragraphs.

intended call type was for a hologram call. As an example, the second feature tag may include tags as shown in the table 1 for various immersive services.

Further, the first and the second feature tag may also be accompanied with inclusion of the real-time transport protocol (RTP) profiles in session description protocol (SDP) during call initiation as defined below:
 a) RTP/HAVP profile for hologram call to represent RTP profile for Hologram with Audio video streams,
 b) RTP/SHAVP for secured hologram call to represent RTP profile for secured Hologram with Audio video streams,
 c) RTP/XRAVP for XR(AR/VR) call to represent RTP profile for extended reality with Audio video streams,
 d) RTP/SXRVP for a secured XR(AR/VR) call to represent RTP profile for secured extended reality with Audio video streams.

According to an embodiment, the second features tag is not just limited to immersive call, the second feature tag may be used in messaging and other services that requires immersive media as disclosed in the present disclosure. For example, but not limited to, consider a scenario the user initiates the immersive call to the second user. Further, due to the unavailability of the user, the immersive media content may be received as message. Thus, the recipient user may download the message and a view the immersive media content later on.

Now, a description will be made for methodology for handling immersive services at client devices in the communication system as describes above through FIGS. 2-9. Further, the reference numerals were kept same throughout for ease of explanation.

Figure 2A:
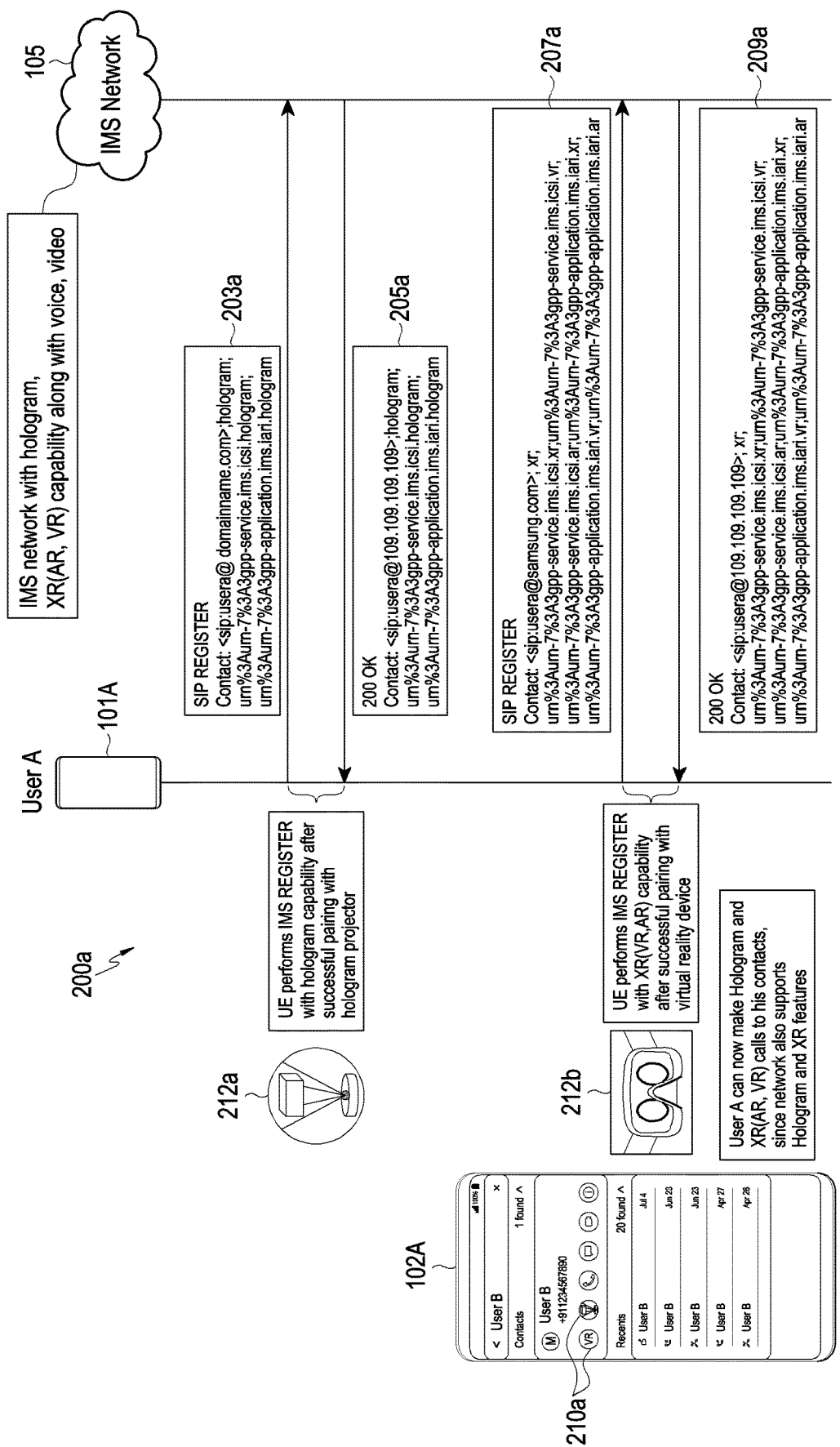
FIG. 2A is a signal flow diagram illustrating an example registration process of IMS register by a user equipment (UE) with a feature tag over the IMS network in a case the IMS network supports immersive services, according to various embodiments.

FIG. 2A is a signal flow diagram 200a illustrating an example registration process of IMS register by a user equipment (UE) 101A with a feature tag over the IMS network in a case the IMS network supports immersive services, according to various embodiments. For example, 200a illustrates an example method of registering the first client device with the IMS network 105 in a case the IMS network is capable of supporting the immersive services.

A user to avail immersive services such as hologram, XR calls over the IMS network, registers the UE 101A on the

TABLE 1

| Immersive Service | +g.3gpp.icsi-ref | +g.3gpp.iari-ref |
|---|---|---|
| Over IMS | urn %3Aurn-7%3A3gpp-service.ims.icsi.hologram | urn %3Aurn-7%3A3gpp-service.ims.iari.hologram |
| | urn %3Aurn-7%3A3gpp-service.ims.icsi.xr | urn %3Aurn-7%3A3gpp-service.ims.iari.xr |
| | urn %3Aurn-7%3A3gpp-service.ims.icsi.vr | urn %3Aurn-7%3A3gpp-service.ims.iari.vr |
| | urn %3Aurn-7%3A3gpp-service.ims.icsi.ar | urn %3Aurn-7%3A3gpp-service.ims.iari.ar |
| Over MCX | urn %3Aurn-7%3A3gpp-service.ims.icsi.mcologram | urn %3Aurn-7%3A3gpp-service.ims.iari.mcologram |
| | urn %3Aurn-7%3A3gpp-service.ims.icsi.mcxr | urn %3Aurn-7%3A3gpp-service.ims.iari.mcxr |
| | urn %3Aurn-7%3A3gpp-service.ims.icsi.mcvr | urn %3Aurn-7%3A3gpp-service.ims.iari.mcvr |
| | urn %3Aurn-7%3A3gpp-service.ims.icsi.mcar | urn %3Aurn-7%3A3gpp-service.ims.iari.mcar |

For example, if the network receives "urn %3Aurn-\7%3A3gppservice.ims.icsi.hologram" tag during registration procedure, then the network understands that the user client is capable of handling hologram call. As an example, the second feature tag may include tags as shown in the table 1 for various immersive services.

For example, if the network receives "urn %3Aurn-\7%3A3gppservice.ims.icsi.hologram" tag during call establishment procedure, then the network understands that the IMS network 105 so that the network recognizes the UE 101A with operational capacity to handle immersive services. As an example, the hologram or an XR services may require an external device, for example but not limited to, a projector 212a or an XR glass 212b as shown in FIG. 2A. Therefore, before performing the IMS registration process, a pairing with the external device is being performed as per the state-of-the-art procedures for rendering content of the hologram and XR. Further, in an alternate scenario the UE 101A is capable of rendering the content of the hologram and XR in itself. Thus, in the later scenario pairing procedure may be skipped.

According to an embodiment, FIG. 2A illustrates example registration request flow generated by the UE 101A to register the capability of handling immersive services calls such as hologram, and extended reality calls, over the IMS network 105.

Initially at 203*a*, the UE 101A, performs a registration with the network 105 for handling immersive call services based on feature tags included in a session initiation protocol (SIP) REGISTER request. According to an embodiment, the UE 101A includes the first feature tag and the second feature tag in the SIP REGISTER request for registering the immersive media streams that is supported by the as a streaming media type.

For example, the UE 101A sends a SIP REGISTER request with a SIP media tag associated with hologram, XR. For this the SIP media tag may be include for example is "sip.hologram" as a first feature tag for registering with the IMS network 105. The "sip.hologram" SIP media tag indicates that the UE 101A supports hologram as a streaming media type for immersive service. As a further example, "sip.xr" may be included as the first feature tag.

According to an embodiment, the UE 102A sends the SIP REGISTER request with the SIP media after successful pairing the UE 102A with an external device providing immersive services, for an example a hologram projector. In an alternative embodiment, the UE 102A sends the SIP REGISTER request with the SIP Media without pairing the UE 102A with any external device if the UE 102A can render the immersive service by itself.

The UE 102A informs the IMS network 105 with the capability of the UE 101A and a reference application in the UE 101A to provide immersive service. Thus, the second feature tag may further be an IMS communication service identifier (ICSI) and an IMS application reference identifier (IARI) for the intended type of initiated call. Thus, the second feature tag is also indicative of capabilities of the UE 102A to handle services such as hologram calls. The second feature tag with ICSI may be for example, "urn %3Aurn-7%3A3gpp-service.ims.icsi.hologram".

The ICSI are unique identifiers to identify the capability of the UE 101A to handle a certain type of immersive service. In the present example, the second feature tag "urn %3Aurn-7%3A3gpp-service.ims.icsi.hologram" indicates that the UE 101A is capable to handle immersive services such as hologram call.

The second feature tag with IARI may be for example "urn %3Aurn-7%3A3gpp-application.ims.iari.hologram". The IARI are unique identifiers to identify an application which may handle the immersive services in UE 101A. The application is present on the UE 101A and is responsible to provide the necessary technical program to execute immersive service such as hologram call according to the present example.

Thereafter, the IMS network 105 determines whether it can provide a provision for the handling of immersive call services. and then, at 205*a*, the IMS network 105 sends response to the UE 101A that the IMS network 105 supports immersive services. In an example embodiment, the IMS network 105 sends the 200 OK success with Contact Header retaining the above mentioned ICSI and IARI via the SIP REGISTER response message, indicating the network 105 supports hologram calls and the request has succeeded to the UE 102A. Thus, receiving a successful response message indicates that the IMS network 105 is enabled to provide the provision of the handling immersive call services. Further, the IMS network 105 retains the first feature tags that was received in the SIP REGISTER request. Further, in a case the IMS network 105 does not supports the requested immersive service then the IMS network 105 send an unsuccessful response message. In such a case the SIP REGISTER response devoid of the first feature tag is received. In such a case the IMS network 105 does not retain the first feature tag.

Further, at 207*a*, the UE 102A, sends the SIP REGISTER request with the SIP media tag for registering the UE 101A for immersive service related to XR. Thus, the SIP Media tag may include for example is "sip.xr" as the first feature tag to the IMS network. The "sip.xr" SIP media tag indicates that the UE 102A supports "XR" as a streaming media type with extended reality type of immersive service. The second feature tag may be the IMS ICSI and the IMS IARI for the intended type of initiated call. Thus, the second feature tag is also indicative of capabilities of the UE 102A to handle services such as extended reality calls. The second feature tag with ICSI mentioned below are unique identifiers to identify the capability of UE 102*a* to handle type of XR service for example, XR, VR, AR. Below a complete description of the tags included in the blocks 203*a* and 207*a* is given.

urn %3Aurn-7%3A3gpp-service.ims.icsi.xr: It is the second feature tag with the ICSI which indicates that the UE 101A supports extended reality immersive services.

urn %3Aurn-7%3A3gpp-service.ims.icsi.vr: It is the second feature tag with the ICSI which indicates that the UE 102*a* supports virtual reality immersive services.

urn %3Aurn-7%3A3gpp-service.ims.icsi.ar: It is the second feature tag with the ICSI which indicates that the UE 101A supports augmented reality immersive services.

Further, the second feature tags also include unique identifiers to identify an application which may handle the XR services in UE 101A that shall be an application on UE 101A, so that external device such as AR/VR glasses 212*b* are paired with UE 101A etc. The second feature tag for indicating the application in the UE 101A for handling the immersive services may be for example:

urn %3Aurn-7%3A3gpp-application.ims.iari.xr: It is the second feature tag with the IARI which indicates that the UE 102A has application supporting extended reality immersive services.

urn %3Aurn-7%3A3gpp-application.ims.iari.vr: It is the second feature tag with the IARI which indicates that the UE 102A has application supporting virtual reality immersive services.

urn %3Aurn-7%3A3gpp-application.ims.iari.ar: It is the second feature tag with the IARI which indicates that the UE 102A has application supporting augmented reality immersive services.

At 209*a*, the IMS network 105 sends response to the UE 101A that the IMS network supports immersive services related to XR services. In an example embodiment, the IMS network sends the 200 OK success with Contact Header retaining the above mentioned ICSI and IARI, indicating the network supports XR, AR, VR calls and the request has succeeded to the UE 101A.

According to a further embodiment the UE 101A may send the SIP REGISTER and the SIP Media tag for multiple immersive services in a single request. In an example, the UE 102*a* may send the SIP REGISTER and the SIP Media tag "sip.hologram" for hologram calls and "sip.xr" for extended reality calls in one single SIP REGISTER request to the IMS network 105.

Thus, post successful registration of the UE 101A over the IMS network 105 and in response receiving the IMS network 105 confirmation supporting immersive services, a plurality of icons 210a are highlighted for the user selection. The highlighting of the plurality of icons on the UE 101A indicates that the user may select the plurality of icons 210a and initiate the immersive service such as hologram call, extended reality call. According to this embodiment UE 101A may correspond to first client device.

Figure 2B:
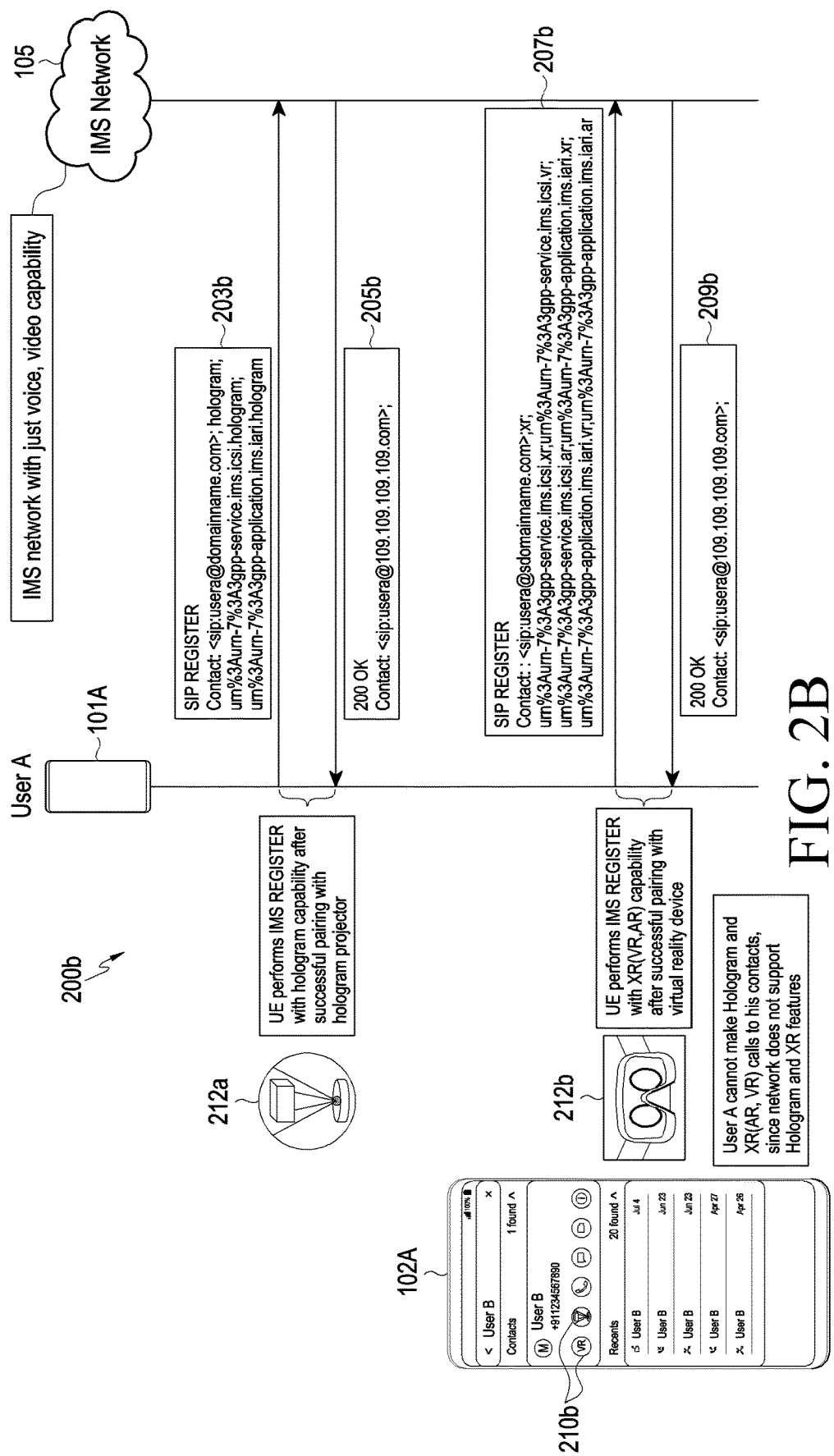
FIG. 2B is a signal flow diagram illustrating an example registration process of IMS register by a UE with a feature tag over the IMS network in a case the IMS network does not support immersive services, according to various embodiments.

FIG. 2B is a signal flow diagram 200b illustrating an example registration process of IMS register by a UE 101A with a feature tag over the IMS network in a case the IMS network does not support immersive services, in accordance with an embodiment of the present disclosure. Process 200b illustrates an example method of registering the first client device with the IMS network 105 in a case the IMS network is incapable of supporting the immersive services. Further, most of the operations in 200b are the same as or similar to those of method 200a as explained in FIG. 2A, therefore details description may not be repeated here.

According to an embodiment, the user for availing immersive services such as hologram, extended reality calls over the IMS network 105, registers the UE 101A on the IMS network 105 so that the network recognizes the UE with operational capacity to handle immersive services.

FIG. 2B illustrates an example registration request flow generated by the UE 101A to register the capability of handling immersive services calls such as hologram, extended reality calls, over the IMS network 105. According to an embodiment, the UE 101A includes the first feature tag and the second feature tag in the SIP REGISTER request for registering the immersive media streams that is supported by the UE 101A as a streaming media type and the immersive services calls.

At 203b, the UE 101A, sends the SIP REGISTER request with the SIP Media tag associated with hologram, XR. The SIP Media tag may be for example is "sip.hologram" as the second feature tag to the IMS network 105. The "sip.hologram" SIP media tag indicates that the UE 101A supports hologram as a streaming media type for immersive service. As a further example, "sip.xr" may be included as the first feature tag.

The UE 101A informs the IMS network 105 with the capability of the UE 101A and a reference application in the UE 101A to provide immersive service. Thus, the second feature tag may be the IMS ICSI and the IMS IARI. The second feature tag is indicative of capabilities of the UE 101A to handle services such as hologram calls. The second feature tag with ICSI may be for example, "urn %3Aurn-7%3A3gpp-service.ims.icsi.hologram". The second feature tag with IARI may be for example "urn %3Aurn-7%3A3gpp-application.ims.iari.hologram".

At 205b, the IMS network 105 sends response to the UE 101A after receiving SIP REGISTER and SIP media tags. In an example embodiment, the IMS network 105 sends, via SIP REGISTER response, the 200 OK success without retaining SIP Media tag, second feature tag in Contact Header as mentioned, indicating the network does not support hologram calls.

Further, at 207b, the UE 101A, sends the SIP REGISTER request with the SIP Media tag. The SIP Media tag may be for example is "sip.xr" as the first feature tag to the IMS network. The "sip.xr" SIP media tag indicates that the UE 101A supports "XR" as a streaming media type for extended reality type of immersive service. The second feature tag with ICSI mentioned below are unique identifiers to identify the capability of UE 101A to handle type of XR service for example, XR, VR, AR.

urn %3Aurn-7%3A3gpp-service.ims.icsi.xr: It is the second feature tag with the ICSI which indicates that the UE 102b supports extended reality immersive services.

urn %3Aurn-7%3A3gpp-service.ims.icsi.vr: It is the second feature tag with the ICSI which indicates that the UE 102b supports virtual reality immersive services.

urn %3Aurn-7%3A3gpp-service.ims.icsi.ar: It is the second feature tag with the ICSI which indicates that the UE 102b supports augmented reality immersive services.

The second feature tag for indicating the application in the UE 101A for handling the immersive services may be included with for example urn %3Aurn-7%3A3gpp-application.ims.iari.xr: It is the second feature tag with the IARI which indicates that the UE 102b has application supporting extended reality immersive services.

urn %3Aurn-7%3A3gpp-application.ims.iari.vr: It is the second feature tag with the IARI which indicates that the UE 102b has application supporting virtual reality immersive services.

urn %3Aurn-7%3A3gpp-application.ims.iari.ar: It is the second feature tag with the IARI which indicates that the UE 102b has application supporting augmented reality immersive services.

At 209b, the IMS network sends response to the UE 101A indicative of whether the IMS network 105 supports immersive services. In an example embodiment, the IMS network 105 may sends the 200 OK success without first feature tag, and second feature tag in Contact Header as mentioned above, indicating that the network does not support XR, AR, VR calls.

According to this embodiment, the IMS network 105 does not support immersive service such as hologram, xr, vr, etc. Thus, the plurality of icons 210b on the UE 102A are not highlighted indicating that the user may not be able to select them for immersive services due to non-availability of such services. According to this embodiment, UE 101A may correspond to the first device.

Figure 3:
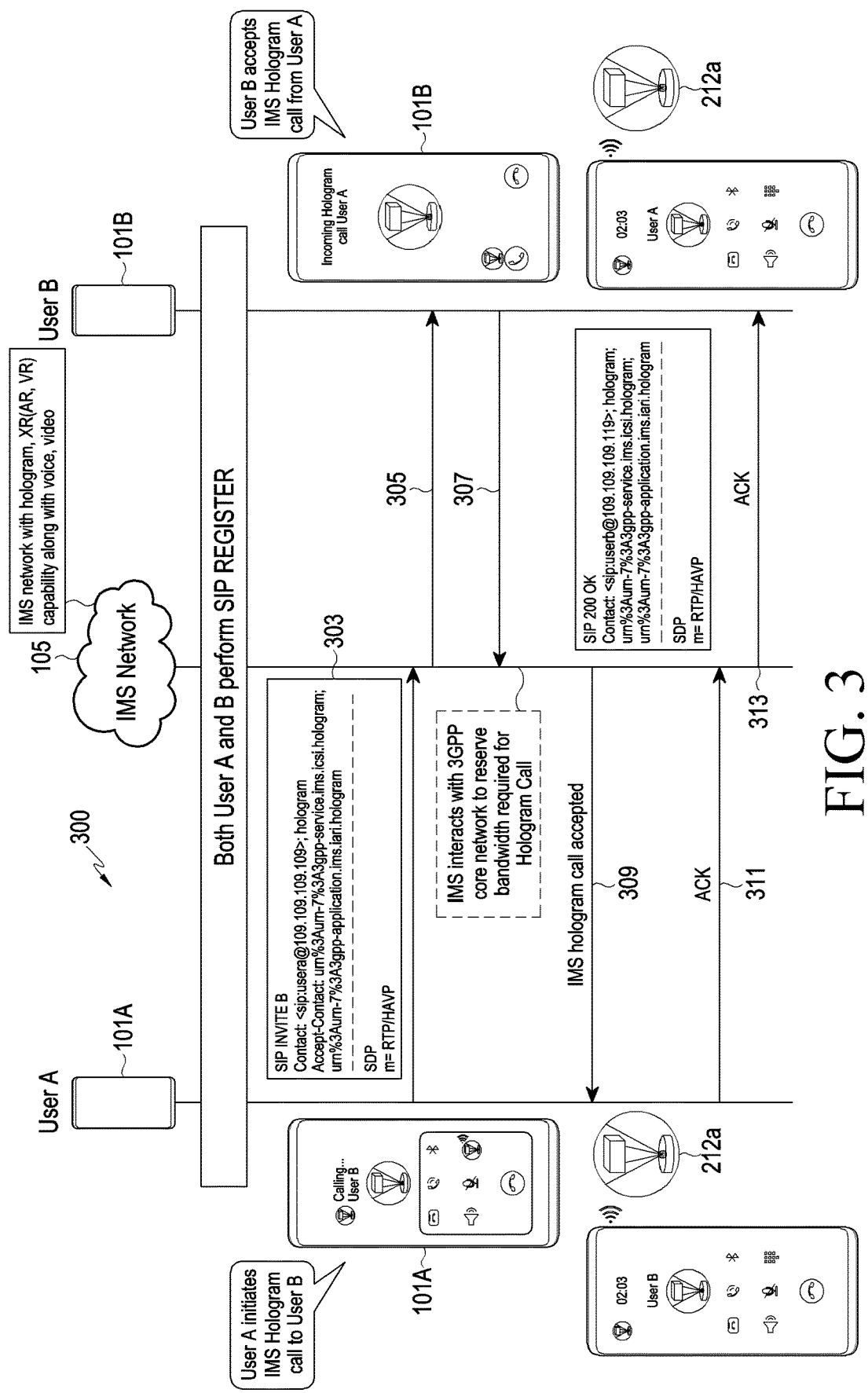
FIG. 3 is a signal flow diagram illustrating an example process of connecting a first UE and a second UE using immersive services such as a hologram call over the IMS network 105, according to various embodiments.

FIG. 3 is a signal flow diagram 300 illustrating an example process of connecting the UE 101A and the UE 101B using immersive services such as a hologram call over the IMS network 105, according to various embodiments. FIG. 3 illustrates that the UE 101A and the UE 101B are operated by two different users desiring to use immersive services and connect via hologram call.

In an embodiment of the present subject matter, FIG. 3 provides request flow generated between the UE 101A, the IMS network 105 and the UE 101B. According to further embodiments, the UE 101A and the UE 101B may be a part of a same group or different group.

In an embodiment, referring to FIG. 2A the UE 101A, sends the SIP REGISTER request with the first feature tag to register the capability of the UE 101A for handling immersive services to the IMS network 105. In an example, the UE 101A registers with the IMS network 105 to handle services related to hologram calls.

Similarly referring to FIG. 1A the UE 101B, sends the SIP REGISTER request with the first feature tag to register the capability of the UE 101B for handling immersive services to the IMS network 105. In an example, the UE 101B registers with the IMS network 105 to handle services related to hologram calls.

The IMS network 105 sends the 200 OK success response code with contact header to the UE 101A and the UE 101B indicating that the IMS network 105 supports the immersive service.

Now, the user operating the UE 101A initiates call using immersive service for example, but not limited to such as hologram call to be establish with UE 101B based on a determination that the IMS network 105 provides the provision of handling immersive call services as explained in FIG. 2A. Thereafter, an SIP INVITE request is sent after the initiation of the immersive call.

Accordingly, at 303, the UE 101A sends an SIP INVITE requests including one or more feature tags to the UE 101B of the plurality of client devices. In particular, the UE 101A sends the SIP INVITE request to the IMS network 105 for initiating an IMS call with the UE 101B. According to an embodiment, the sent SIP INVITE request includes a second feature tags indicative of an intended type of immersive call services for the initiated immersive call by the first client device for making the immersive call with the second client device.

Thus, the SIP INVITE request includes the second feature tag indicative of a preference of the UE 101A to perform immersive services. In a current example, the UE 101A prefers to perform hologram call, therefore, the second feature tag represents the UE 101A operation to perform hologram call. Further, SIP INVITE request includes other information related to SIP headers and SDP attributes. Table 2 illustrates an example of the one or more second features tags for the hologram call.

TABLE 2

SIP INVITE B
Contact: <sip:usera@109.109.109.109>; hologram
Accept-Contact: urn%3Aurn-7%3A3gpp-service.ims.icsi.hologram;
urn%3Aurn-7%3A3gpp-application.ims.iari.hologram
---
SDP
m= RTP/HAVP At 305, the IMS network 105 transmits the SIP INVITE request to the UE 101B. Along with the SIP INVITE request, RTP profile is transmitted in SDP. In an example, RTP/HAVP profile is used for hologram call.

At 307, the SIP INVITE request is accepted by the UE 101A when the intended type immersive call services that is included in the second feature tag is supported by the UE 101B and accepted by the end user from UI. Accordingly, the UE 101B sends the 200 OK success status response code to the IMS network in response to receiving the SIP INVITE request from the UE 101A. The 200 OK success status response code may indicate that the call request is accepted by the user operating the UE 101B and thus the UE 101B sends the second feature tag with RTP profile for establishing the hologram call. Thereafter, the IMS network 105 interacts with a core network to reserve bandwidth required for hologram call as detailed in media negotiated under RTP/HAVP profile. Further, the SIP 200 OK success status response code may include information related to other SIP headers and SDP attributes. Table 3 depicts an example of the one or more second features tags included in SIP 200 OK success status response code for the hologram call.

TABLE 3

SIP 200 OK
Contact: <sip:userb@109.109.109.119>; hologram;
urn%3Aurn-7%3A3gpp-service.ims.icsi.hologram;
urn%3Aurn-7%3A3gpp-application.ims.iari.hologram
---
SDP m= RTP/HAVP Further, at 309, the IMS network 105 shall request for bearer resource required for hologram call to the core network and transmits the 200 OK success status response code received from the UE 101B to the UE 101A.

At 311, the UE 101A sends the ACK acknowledgment message to the IMS network 105 in response to receiving the 200 OK success status response code. Further, at 313, the IMS network 105 transmits the ACK acknowledgment message received from the UE 101A to the UE 101B.

Thus, the hologram call is established between the UE 101A and the UE 101B in IMS network 105. In an embodiment, the UE 101A and the UE 101B may be paired with the external device for rendering the immersive services as explained in FIG. 2A. In an example the external device is the hologram projector 212a rendering the hologram of the users.

Figure 4:
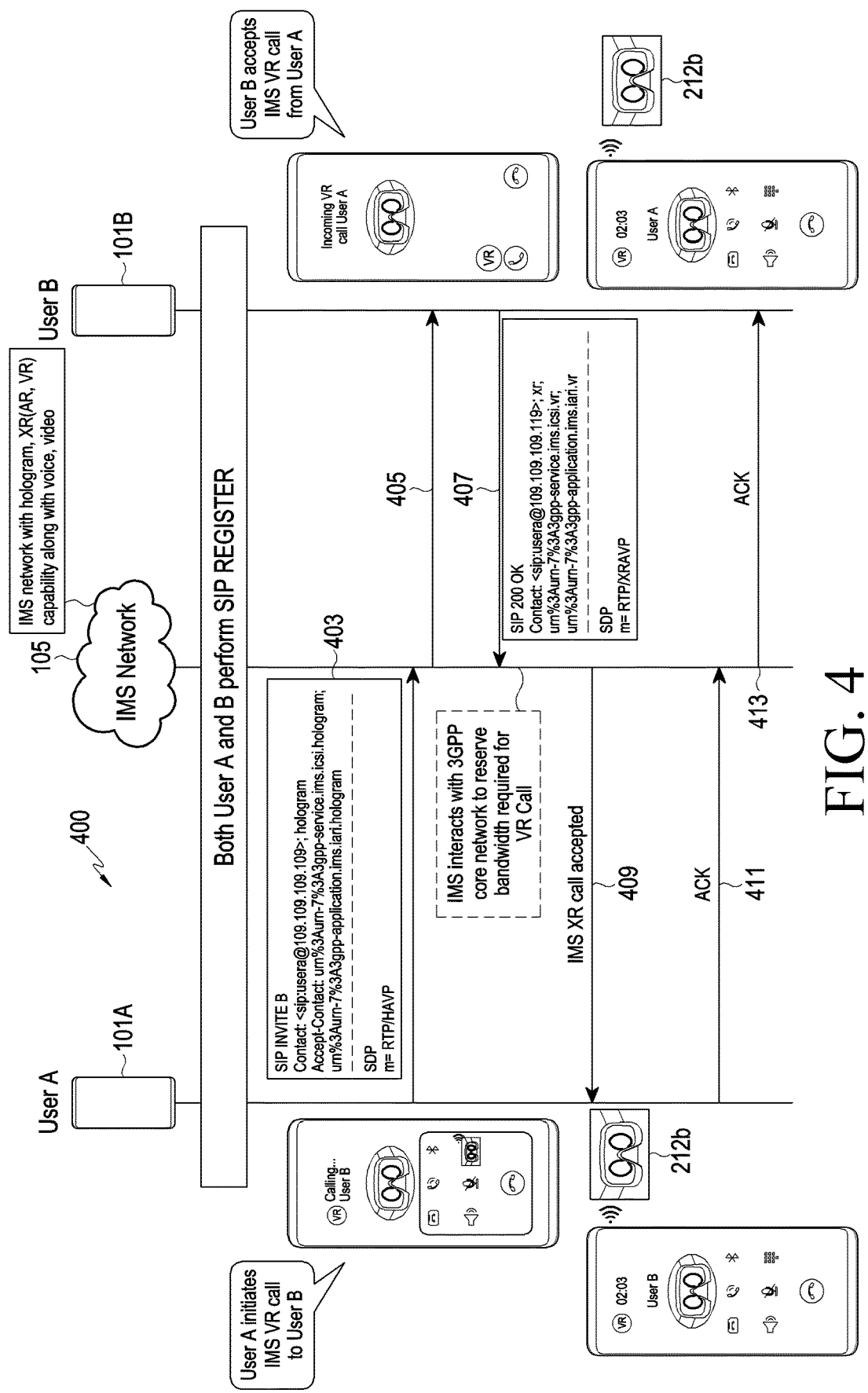
FIG. 4 is a signal flow diagram illustrating an example process of connecting a first UE and a second UE using immersive services such as an XR call with the feature tag over the IMS network 105, according to various embodiments.

FIG. 4 is a signal flow diagram 400 illustrating an example process of connecting the UE 101A and the UE 101B using immersive services such as an XR call with the feature tag over the IMS network 105, according to various embodiments. FIG. 4 illustrates that the UE 101A and the UE 101B are operated by two different users desiring to use immersive services and connect via XR call.

In an embodiment, FIG. 4 provides request flow generated by the UE 101A, the IMS network and the UE 101B. The steps involve here are mostly similar with the steps defined in FIG. 3. The features tags involves an extension with "xr".

According to an embodiment, referring to FIG. 2A, the UE 101A, sends the SIP REGISTER request with the first feature tag to register the capability of the UE 101A for handling immersive services to the IMS network 105. In an example, the UE 101A registers with the IMS network 105 to handle services related to XR like AR, VR calls, and alike.

Similarly referring to FIG. 2A, the UE 101B sends the SIP REGISTER request with the first feature and second tags to register the capability of the UE 101B for handling immersive services to the IMS network 105. In an example, the UE 101B registers with the IMS network 105 to handle services related to XR like AR, VR calls etc.

The IMS network 105 sends the 200 OK success response code with contact header to the UE 101A and the UE 101B indicating that the IMS network 105 support the immersive service.

The user operating the UE 101A initiate call using immersive service. The UE 101A, at 403, sends the SIP INVITE request to the IMS network 105 for initiating the call with immersive service with the UE 101B. In an example, the UE 101A initiates VR call with the UE 101B. The SIP INVITE request may include the second feature tag indicative of a preference of the UE 101A to perform immersive service. In an example, the UE 101A prefers to perform VR call, therefore, the second feature tag represents the UE 202A operation to perform XR call. Further, SIP INVITE request includes other information related to SIP headers and SDP attributes Table 4 depicts an example of the one or more second features tags for the XR call.

TABLE 4

SIP INVITE B
Contact: <sip:usera@109.109.109.109>; xr
Accept-Contact: urn%3Aurn-7%3A3gpp-service.ims.icsi.vr;
urn%3Aurn-7%3A3gpp-application.ims.iari.vr
--------------------------------------------------------------------------
SDP m= RTP/XRAVP At 405, the IMS network 105 transmits the SIP INVITE request to the UE 101B. Along with the SIP INVITE request, the RTP profile is transmitted. In an example, RTP/XRAVP profile is used for XR call.

At 407, the UE 101B sends the 200 OK success status response code to the IMS network 105 in response to receiving the SIP INVITE request from the UE 101A. In an embodiment, the 200 OK success status response code may indicate that the request is accepted by the UE 101B and accepted by the end user from UI, thus sending the second feature tag with RTP profile for establishing the VR call. Thereafter, the IMS network 105 interacts with a core network to reserve bandwidth required for the XR call as detailed in media negotiated under RTP/XRAVP profile. Further, the SIP 200 OK success status response code may include information related to other SIP headers and SDP attributes. Table 5 depicts an example of the one or more second features tags included in SIP 200 OK success status response code for the XR call.

TABLE 5

SIP 200 OK
Contact: <sip:usera@109.109.109.119>;   xr;
urn%3Aurn-7%3A3gpp-service.ims.icsi.vr;
urn%3Aurn-7%3A3gpp-application.ims.iari.vr
--------------------------------------------------------------------------
SDP m= RTP/XRAVP Further, at 409, the IMS network 105 shall request for bearer resource required for VR call to the core network and transmits the 200 OK success status response code received from the UE 101B to the UE 101A.

At 411, the UE 101A sends the ACK acknowledgment message to the IMS network in response to receiving the 200 OK success status response code. Further, at 413, the IMS transmits the ACK acknowledgment message received from the UE 101A to the UE 101B.

Thus, the VR call is established between the UE 101A and the UE 101B. In an embodiment, the UE 101A and the UE 101B may be paired with the external device for rendering the immersive service. In an example the external device is a virtual reality glass 212b rendering the virtual reality image of the users.

Further, description will be made of handling the immersive services in the MCX network.

Figure 5:
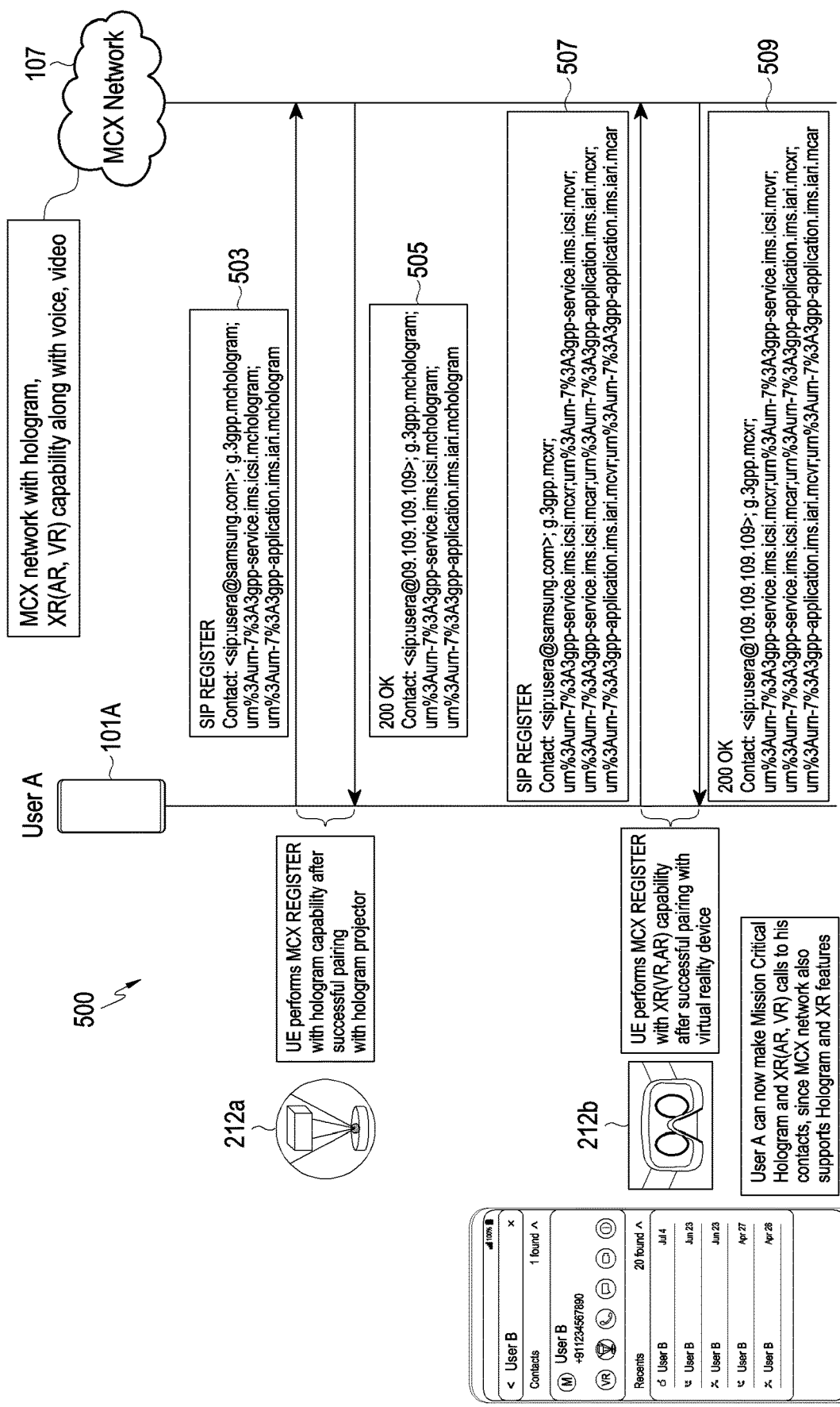
FIG. 5 is a signal flow diagram illustrating an example process of MCX register by a UE with a feature tag over a MCX network, according to various embodiments.

FIG. 5 is a signal flow diagram 500 illustrating an example process of MCX register by a UE 101A with a feature tag over a MCX network 107, according to various embodiments. The process 500 is similar to the process as describes in FIGS. 2A-4 which is for the IMS network. The primary difference being the network over which the UE wants to establish the communication and UE type being designed for mission critical services.

The user to avail immersive services such as hologram, extended reality calls over the MCX network 107, registers the UE 101B on the MCX network 105 so that the MCX network 107 recognizes the UE 101A with operational capacity to handle immersive services.

In an embodiment of the present subject matter, FIG. 5 provides registration request flow generated by the UE 101A to register the capability of handling immersive services calls such as hologram, extended reality calls, over the MCX network 107. According to an embodiment, the UE 101A includes the first feature tag and the second feature tag in the SIP REGISTER request for registering the immersive media streams that is supported by the UE 101A as a streaming media type and the immersive services calls.

At 503, the UE 101A sends the SIP REGISTER request with the SIP Media tag associated with hologram, and XR. The SIP media tag may be for example is "g.3gpp.mchologram" as the first feature tag to the MCX network 107. The media tag is indicative of capabilities of the UE 101B to supports mission critical hologram (MCHologram) media streaming. As a further example, "g.3gpp.mcxr" may be included as the first feature tag.

In an embodiment, the UE 101A sends the SIP REGISTER with the SIP media after successful pairing the UE 101A with an external device providing immersive services, for an example the hologram projector 212a. In an alternative embodiment, the UE 101A sends the SIP REGISTER with the SIP media without pairing the UE 101A with any external device if the UE 101A can render the immersive service by itself. The pairing of the UE 101A with any of the external device is explained in detail in FIG. 2A. Therefore, for the sake of brevity the same may not be repeated here.

The UE 101A informs the MCX network 107 with the capability of the UE 101A and a reference application in the UE 101A to provide immersive service. Thus, the second feature tag further may correspond to the IMS ICSI and the IMS IARI. The second feature tag is indicative of capabilities of the UE 101A to handle services such as hologram calls in MCX network 107. The second feature tag with ICSI may be for example, "urn %3Aurn-7%3A3gpp-service.ims.icsi.mchologram" are unique identifiers to identify the UE 101A capability to handle type of immersive service in the MCX network 107 for example, hologram etc. The second feature tag with the IARI may be for example, "urn %3Aurn-7%3A3gpp-application.ims.iari.mchologram" are unique identifiers to identify an application which may handle the immersive services in the UE 101A that shall be an application on UE 101A, used for pairing with the hologram projector 212a.

At 505, the MCX network 107 sends response to the UE 101A that the MCX network 107 supports immersive services. In an example embodiment, the MCX network 107 sends the 200 OK success with contact header retaining the above-mentioned media tag, ICSI and IARI, indicating the MCX network 107 supports hologram call, and the request has succeeded to the UE 101A.

Further, at 507, the UE 101A sends the SIP REGISTER request with the SIP media tag. The SIP media tag may be for example is "g.3gpp.mcx" and the first feature tag to the MCX network 107. The media tag "g.3gpp.mcx" is indicative of capabilities of the UE 101A to support mission critical XR (MCXR) communication such as XR, AR, VR etc.

The second feature tag may be the IMS ICSI and an IMS IARI. The second feature tag is indicative of capabilities of the UE 101A to handle services such as extended reality calls. The second feature tag with the ICSI mentioned below are unique identifiers to identify the UE 101A capability to handle type of extended reality service for example, XR, VR, AR. The ICSI are for example:

urn %3Aurn-7%3A3gpp-service.ims.icsi.mcxr: It is the second feature tag with the ICSI which indicates that the UE 101A supports extended reality immersive services.

urn %3Aurn-7%3A3gpp-service.ims.icsi.mcvr: It is the second feature tag with the ICSI which indicates that the UE 101A supports virtual reality immersive services.

urn %3Aurn-7%3A3gpp-service.ims.icsi.mcar: It is the second feature tag with the ICSI which indicates that the UE 101A supports augmented reality immersive services.

The IARI mentioned below are unique identifiers to identify an application which may handle the extended reality services in the UE 101A that shall be an application on the UE 101A, such as AR/VR glasses 212b paired with the UE 101A etc.

urn %3Aurn-7%3A3gpp-application.ims.iari.mcxr: It is the second feature tag with the IARI which indicates that the UE 101A has application supporting extended reality immersive services.

urn %3Aurn-7%3A3gpp-application.ims.iari.mcvr: It is the second feature tag with the IARI which indicates that the UE 101A has application supporting virtual reality immersive services.

urn %3Aurn-7%3A3gpp-application.ims.iari.mcar: It is the second feature tag with the IARI which indicates that the UE 101A has application supporting augmented reality immersive services.

At 509, the MCX network 107 sends response to the UE 101A that the MCX network 107 supports immersive services. In an example embodiment, the MCX network 107 sends the 200 OK success with contact header retaining the above mentioned media tag, ICSI and IARI, indicating the MCX network 107 supports XR, AR, VR calls and the request has succeeded to the UE 101A.

Figure 6:
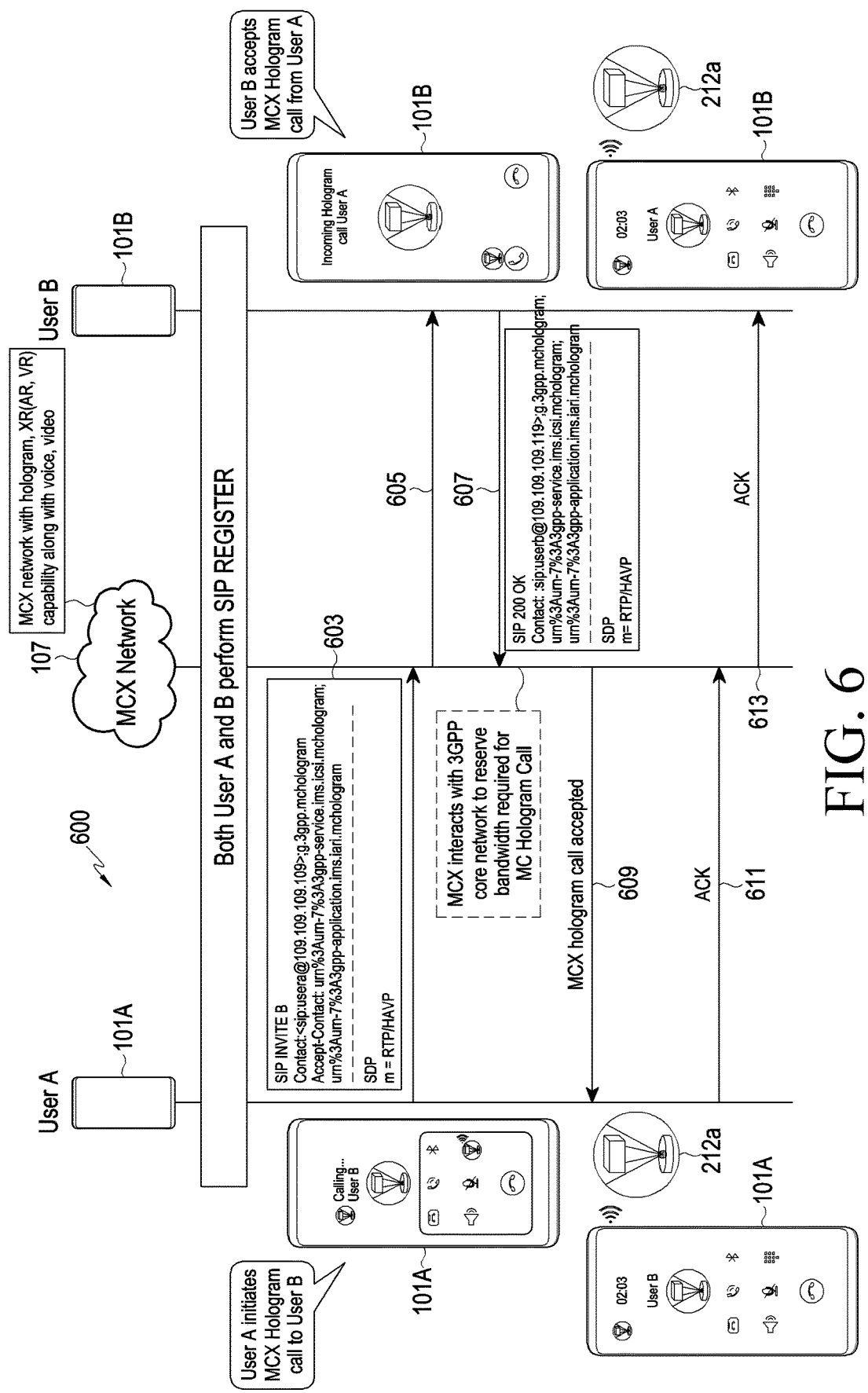
FIG. 6 is a signal flow diagram illustrating an example process of connecting a first UE and a second UE using immersive services such as the hologram call over the MCX network, according to various embodiments

FIG. 6 is a signal flow diagram 600 illustrating an example process of connecting a UE 101A and a UE 102B using immersive services such as the hologram call over the MCX network 107, according to various embodiments. The operations of FIG. 6 are mostly similar with the operations described in FIG. 3.

According to an embodiment, FIG. 6 illustrates that the UE 101A and the UE 101B are operated by two different users desiring to use immersive services and connect via call on the MCX network 107.

In an embodiment, FIG. 6 provides request flow generated by the UE 101A, the MCX network 107 and the UE 101B.

In an embodiment, referring to FIG. 3, the UE 101A is in MCX network 107, sends the SIP REGISTER request with the first feature tag and the second feature tag to register the capability of the UE 101A for handling immersive services to the MCX network 107. In an example, the UE 101A registers with the MCX network 107 to handle services related to hologram.

Similarly referring to FIG. 5, the UE 101B in MCX network 107, sends the SIP REGISTER request with the first feature tags and the second feature tags to register the capability of the UE 101B for handling immersive services to the MCX network 107. In an example, the UE 101B registers with the MCX network 107 to handle services related to hologram calls in MCX network 107.

The MCX network 107 sends the 200 OK success response code with contact header to the UE 101A and the UE 101B indicating that the MCX network 107 support the immersive service.

The user operating the UE 101A initiates call using immersive service such as hologram call. At 603, the UE 101A sends the SIP INVITE request to the MCX network 107 for initiating a hologram call with the UE 101B. The SIP INVITE request may include a second feature tag indicative of preference of the UE 101A to perform immersive services. In an example, the UE 101A prefers to perform hologram call, therefore, the second feature tag represents the UE 101A operation to perform hologram call. Further, SIP INVITE request includes other information related to SIP headers and SDP attributes. Table 6 depicts an example of the one or more second features tags for the hologram call.

TABLE 6

SIP INVITE B
Contact:<sip:usera@109.109.109.109>;g.3gpp.mchologram
Accept-Contact: urn%3Aurn-7%3A3gpp-service.ims.icsi.mchologram;
urn%3Aurn-7%3A3gpp-applicaiion.ims.iari.mchologram
--------------------------------------------------------------------------------
SDP m= RTP/HAVP At 605, the MCX network 107 transmits the SIP INVITE request to the UE 101B. Along with the SIP INVITE request, RTP profile is transmitted in SDP. In an example, RTP/HAVP profile is used for hologram call. At 607, the UE 101B sends the 200 OK success status response code to the MCX network 107 in response to receiving the SIP INVITE request. In an embodiment, the 200 OK success status response code may indicate that the request is accepted by the user operating the UE 101B and thus sending the second feature tag with RTP profile for establishing the hologram call. Thereafter, the MCX network 107 interacts with a core network to reserve bandwidth required for the hologram call as detailed in media negotiated under RTP/HAVP profile. Further, the SIP 200 OK may include information related to other SIP headers and SDP attributes. Table 7 depicts an example of the one or more second features tags included in SIP 200 OK success status response code for the hologram call.

TABLE 7

SIP 200 OK
Contact: :sip:userb@109.109.109.119>;g.3gpp.mchologram;
urn%3Aurn-7%3A3gpp-service.ims.icsi.mchologram;
urn%3Aurn-7%3A3gpp-application.ims.iari.mchologram
--------------------------------------------------------------------------------
SDP m= RTP/HAVP Further, at 609, the MCX network 107 shall request for bearer resource required for hologram call and transmits the 200 OK success status response code received from the UE 101B to the UE 101A.

At 611, the UE 101A sends the ACK acknowledgment message to the MCX network 107 in response to receiving the 200 OK success status response code. Further, at 613, the MCX network 107 transmits the ACK acknowledgment message received from the UE 101A to the UE 101B.

Thus, the hologram call is established between the UE 101A and the UE 101B in MCX network 107. In an embodiment, the UE 101A and the UE 101B may be paired with the external device for rendering the immersive service. In an example the external device is the hologram projector 212a rendering the hologram of the users. Further, the pairing process is described in FIG. 2A, and may not be repeated here for the sake of brevity.

Figure 7:
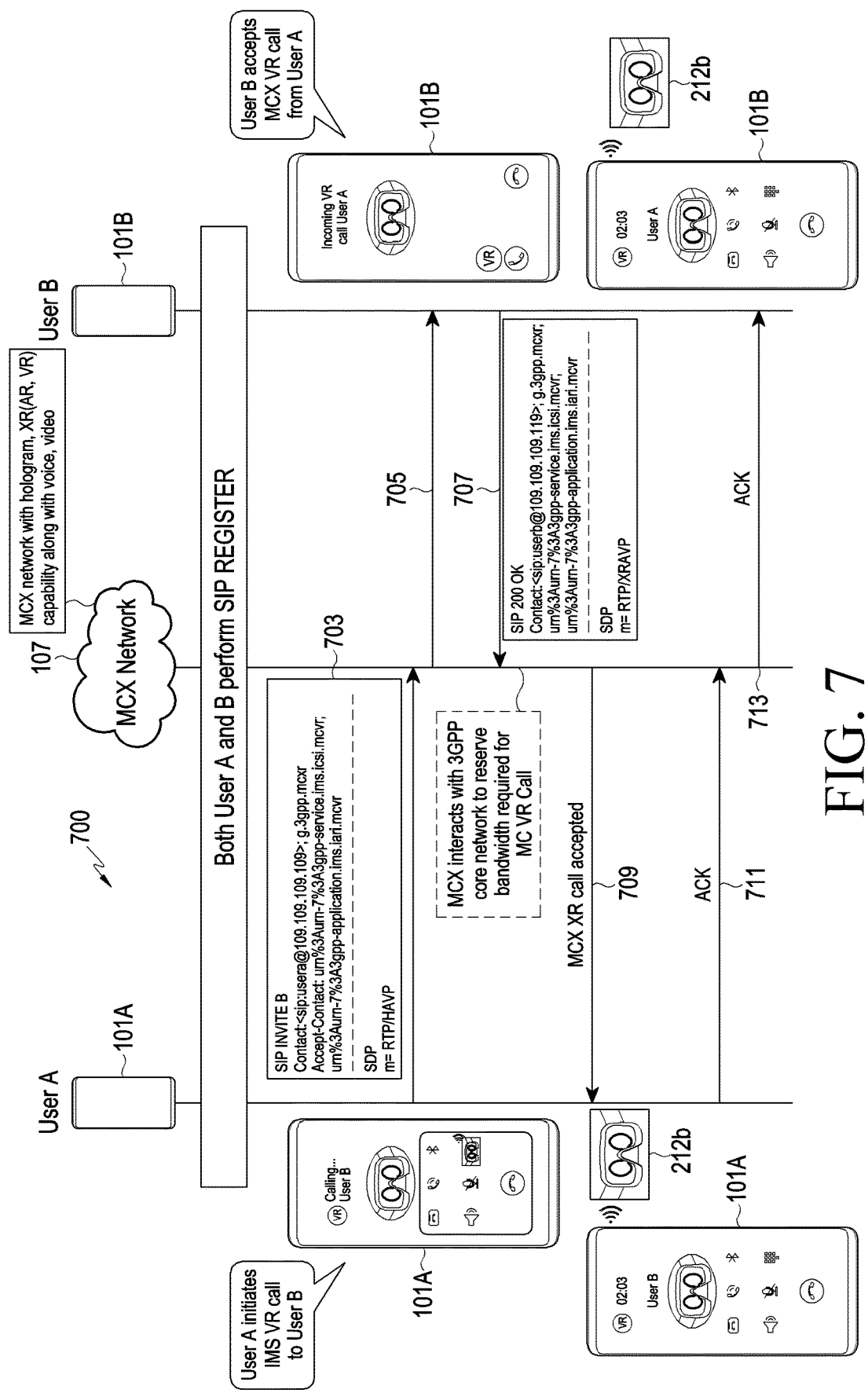
FIG. 7 is a signal flow diagram illustrating an example process of connecting the first UE and the second UE using immersive services such as the XR call with the feature tag over the MCX network, according to various embodiments.

FIG. 7 is a signal flow diagram 700 illustrating an example process of connecting the UE 101A and the UE 101B using immersive services such as the XR call with the feature tag over the MCX network 107, according to various embodiments. The operations 700 are mostly similar to FIG. 4 as described above.

FIG. 7 illustrates that the UE 101A and the UE 101B are operated by two different users desiring to use immersive services and connect via hologram call.

In an embodiment, FIG. 7 provides request flow generated by the UE 101A, the MCX network 107 and the UE 101B.

In an embodiment, referring to FIG. 3, the UE 101A in MCX network 107, sends the SIP REGISTER request with the first feature tags and second feature tags to register the capability of the UE 101A for handling immersive services to the MCX network 107. In an example, the UE 101A registers request with the MCX network 107 to handle services related to XR like AR, VR calls etc.

Similarly referring to FIG. 5, the UE 101B in MCX network 107, sends the SIP REGISTER request with the first feature tag and the second feature tags to register the capability of the UE 101B for handling immersive services to the MCX network 107. In an example, the UE 101B registers request with the MCX network 107 to handle services related to XR like AR, VR calls etc.

The MCX network 107 sends the 200 OK success response code with contact header to the UE 101A and the UE 101B indicating that the MCX network 107 support the immersive service.

The user operating the UE 101A initiates a call using immersive service. The UE 101A, at 703, sends the SIP INVITE request to the MCX network 107 for initiating the XR call with the UE 101B. The SIP INVITE request may include a second feature tag indicative of a preference of the UE 101A to perform immersive services. In an example, the UE 101A prefers to perform VR call, therefore, the second feature tag represents the UE 101A operation to perform VR call.

At 705, the MCX network transmits the SIP INVITE request to the UE 101B. Along with the SIP INVITE request, RTP profile is transmitted. In an example, RTP/XRAVP profile is used for VR call. The SIP invite request includes a one or more second feature tags. Further, SIP INVITE request includes other information related to SIP headers and SDP attributes. Table 8 depicts an example of the one or more second features tags for the VR call.

TABLE 8

| SIP INVITE B |
|---|
| Contact:<sip:usera@109.109.109.109>; g.3gpp.mcxr |
| Accept-Contact: urn%3Aurn-7%3A3gpp-service.ims.icsi.mcvr; urn%3Aurn-7%3A3gpp-application.ims.iari.mcvr |
| SDP m= RTP/XRAVP |

At 707, the UE 101B sends the 200 OK success status response code to the MCX network 107 in response to receiving the SIP INVITE request. In an embodiment, the 200 OK status response code may indicate that the request is accepted by the UE 101B and accepted by the end user from UI, thus sending the second feature tags with RTP profile for establishing the VR call. Thereafter, the MCX network 107 interacts with a core network to reserve bandwidth required for the hologram call as detailed in media negotiated under RTP/XRAVP profile. Further, the SIP 200 OK may include information related to other SIP headers and SDP attributes. Table 9 depicts an example of the one or more second features tags included in SIP 200 OK success status response code for the VR call.

TABLE 9

| SIP 200 OK |
|---|
| Contact:<sip:userb@109.109.109.119>; g.3gpp.mcxr; urn%3Aurn-7%3A3gpp-service.ims.icsi.mcvr; urn%3Aurn-7%3A3gpp-application.ims.iari.mcvr |
| SDP m= RTP/XRAVP |

Further, at 709, the MCX network 107 shall request for bearer resource required for VR call and transmits the 200 OK success status response code received from the UE 101B to the UE 101A.

At 711, the UE 101A sends the ACK acknowledgment message to the MCX network 107 in response to receiving the 200 OK success status response code. Further, at step 713, the MCX network 107 transmits the ACK acknowledgment message received from the UE 101A to the UE 101B.

Thus, the VR call is established between the UE 101A and the UE 101B. In an embodiment, the UE 101A and the UE 101B may be paired with the external device for rendering the immersive service. In an example the external device is the virtual reality glass 212b rendering the virtual reality image of the users.

Figure 8:
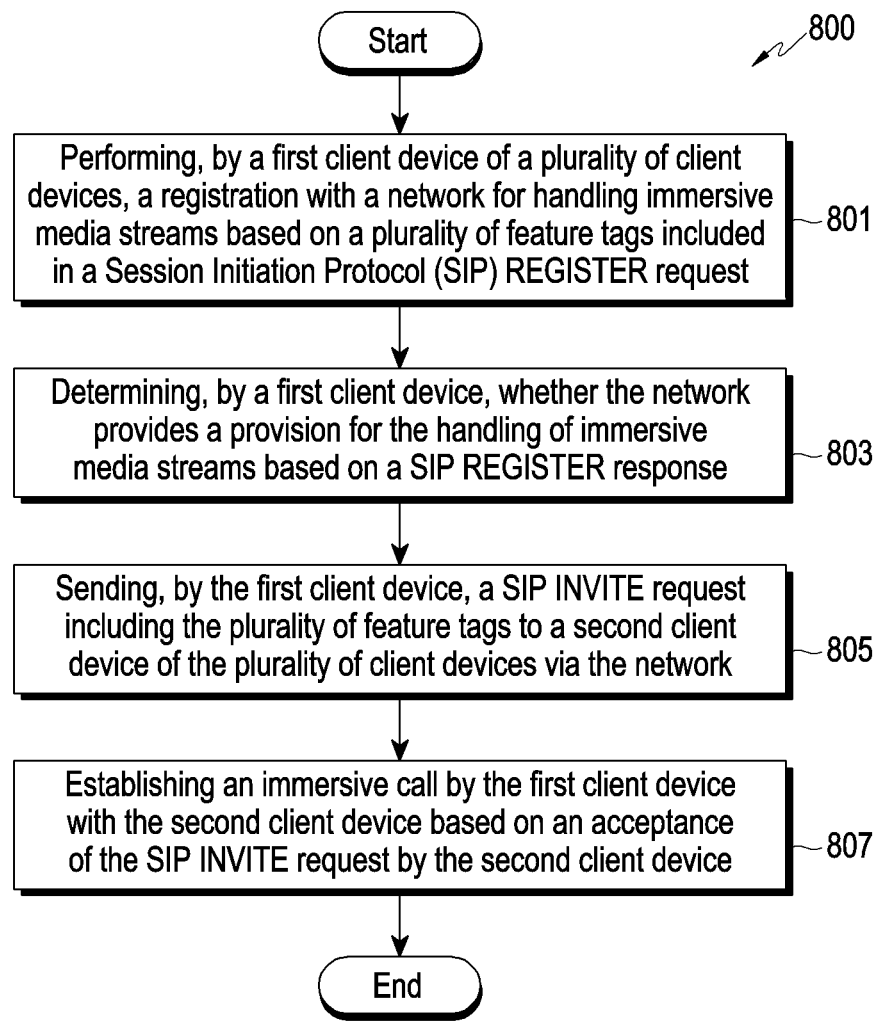
FIG. 8 is a flow chart illustrating an example method for handling immersive services at client devices, according to various embodiments.

FIG. 8 is a flowchart illustrating an example method for handling immersive services, according to various embodiments. The method 800 is explained in detail in FIGS. 2A-7. Therefore, details description of the same may not be repeated here for the sake of brevity. The method 800 is performed by the UE 101A that is acting as first client device here. Further, an immersive call is being establish by the UE 101A with the UE 101B that is acting as a second client device.

According to an embodiment, method 800 initially includes operation 801 performing, by a first client device of a plurality of client devices, a registration with a network for handling immersive call services based on a plurality of feature tags included in a SIP REGISTER request. The method 800 moves to operation 803 that includes determining whether the network provides a provision for the handling of immersive call services based on a SIP REGISTER response.

The method 800 moves to operation 805 that includes sending, by the first client device, a SIP INVITE request including the plurality of feature tags to a second client device of the plurality of client devices via the network.

Further, at operation 807 the method 809 includes establishing the immersive call by the first client device with the second client device based on an acceptance of the SIP INVITE request by the second client device.

Accordingly, the disclosure provides at least following technical advantages.

The method discloses a simple and clear proposals to IMS, MCX:

Providing feature tags to identifying immersive services in IMS, MCX over 3GPP networks Facilitating devices to register their applications that handle immersive services Facilitating devices to convey their desire call (derived by user selection in user experience (UX)) to establish IMMSERSIVE services.

Extension of RTP payloads to support the immersive content.

Above methods are for realizing immersive Services in IMS, MCX over 3GPP networks. Further, the disclosed methods may be implemented in metaverse, as it utilizes AR, VR services to provide metaverse experience to the end users.

Figure 9:
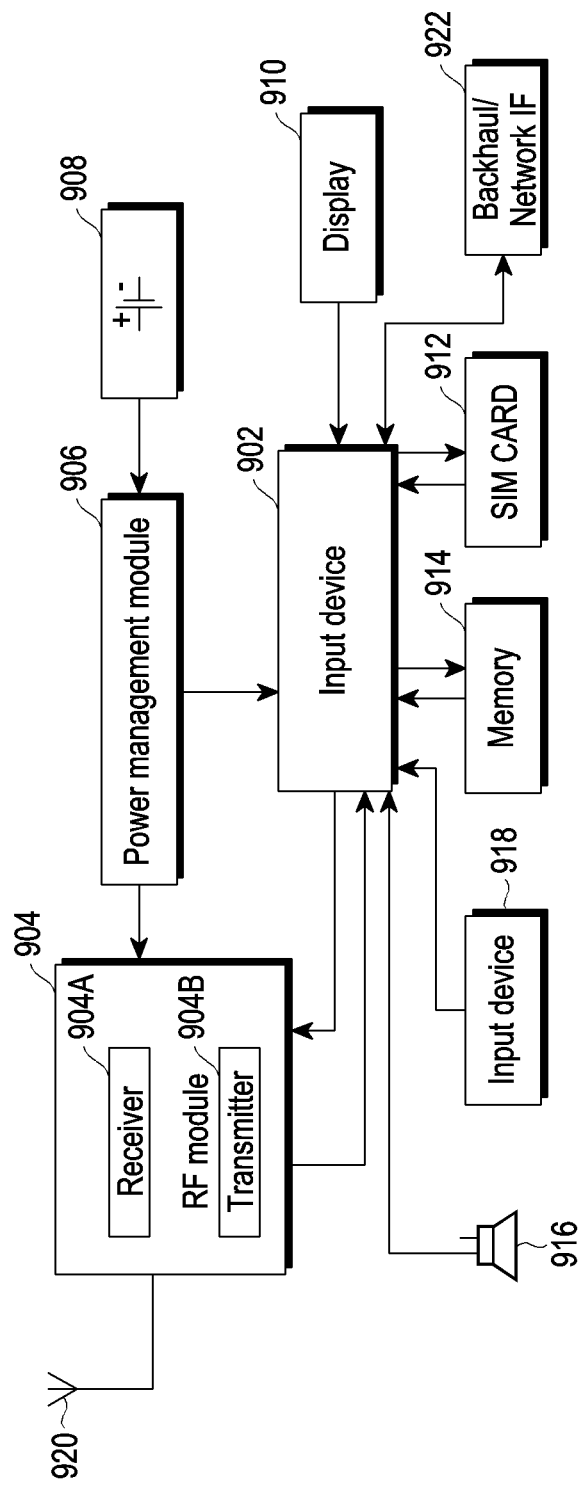
FIG. 9 is a block diagram illustrating an example configuration of a wireless communication system including a transmitter and a receiver, according to various embodiments.

FIG. 9 is a block diagram illustrating an example configuration of a wireless communication system including a transmitter and a receiver, according to various embodiments. The wireless communication system as shown in FIG. 9 may correspond to the BS 103 and/or UE 101 adapted to perform a THz communication to exchange data between them. The wireless communication system as shown in FIG. 9 is configured to perform the operations illustrated in FIGS. 2A-8 but it can be any system for performing the operations of FIGS. 2A-8.

As shown in FIG. 9, the wireless communication system may include at least one processor (e.g., including processing circuitry) 902 and a radio frequency (RF) module (e.g., including RF circuitry) (transceiver 904). The processor 902 is electrically connected with the transceiver 904 and controls the transceiver 904. The communication system may further include an antenna 920 connected to the RF module (transceiver 904), a power management module (e.g., including power management circuitry) 906, a battery 908, a display 910, a subscriber identity module (SIM) card 912, a memory 914, a speaker 916, an input device (e.g., including input circuitry) 918, and a backhaul/network intermediate frequency (IF) 922 based on an example implementation.

For example, the wireless communication system of FIG. 9 as the UE 101 comprises a receiver 904A configured to receive a message from a network or the BS 103, and a transmitter 904B configured to transmit the transmission or reception timing information to the BS 103 or the network. The receiver 904A and the transmitter 904B comprise the transceiver 904. The wireless communication system of FIG. 9 as the UE 101 comprises the processor 902, where the processor 902 is connected to the transceiver (e.g., including receiver 904A and transmitter 904B).

The wireless communication system of FIG. 9 may correspond to the BS 103 comprising a transmitter 904B configured to transmit a message to the UE 101 and a receiver 904A configured to receive the transmission or reception timing information from the UE 101. The receiver 904A and the transmitter 904B comprise the transceiver 904, where the processor 902 is connected to the transceiver 904 (e.g., including receiver 904A and transmitter 904B).

Depending on the network type, the term "base station" or "BS" may refer to any component (or collection of components) configured to provide wireless access to a network, such as an enhanced base station (eNodeB or gNB), a 5G base station (gNB), a WiFi access point (AP), or other wirelessly enabled devices. Base stations may provide wireless access in accordance with one or more wireless communication protocols, e.g., 5G 3GPP new radio interface/access (NR), long-term evolution (LTE), LTE advanced (LTE-A), high-speed packet access (HSPA), Wi-Fi 802.11a/b/g/n/ac, etc. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the present disclosure to refer to remote wireless equipment that wirelessly accesses a BS.

The processor 902 can include one or more processors or other processing devices that control the overall operation of the BS 103 and/or the UE 101. For example, the processor 902 could control the reception of forward channel signals and the transmission of reverse channel signals by the transceiver 904 in accordance with well-known principles. The processor 902 could support additional functions as well, such as more advanced wireless communication functions. For instance, the processor 902 could support beam forming or directional routing operations in which outgoing/incoming signals from/to multiple antennas are weighted differently to effectively steer the outgoing signals in a desired direction. Any of a wide variety of other functions could be supported in the BS 103 or the UE 101 by the processor 902.

The processor 902 is also coupled to the backhaul/network IF 922. The backhaul/network IF 922 allows the BS 103 and/or the UE 101 to communicate with other devices or systems over a backhaul connection or a network. The backhaul/network IF 922 could support communications over any suitable wired or wireless connection(s). For example, when the BS 103 is implemented as part of a cellular communication system (such as one supporting 5G, LTE, or LTE-A), the backhaul/network IF 422 could allow the BS 103 to communicate with other base stations (BSs) over a wired or wireless backhaul connection. The backhaul/network IF 922 may include any suitable structure supporting communications over a wired or wireless connection, such as an ethernet or an RF transceiver.

Various embodiments of the present disclosure provide various methods for managing and overcoming the beam misalignment problem in the THz communication due to the change in the orientation and the mobility of the UEs. While various embodiments are discussed as being used in connection with THz communication systems, the present disclosure is not limited thereto. For example, various embodiments of the present disclosure may be implemented in any frequency range communication system including but is not limited to, GHz, 5G, LTE, and 4G communication systems.

As would be apparent to a person in the art, various working modifications may be made to the method in order to implement the disclosure.

The drawings and the forgoing description give examples of embodiments. Those skilled in the art will appreciate that one or more of the described elements may well be combined into a single functional element. Certain elements may be split into multiple functional elements. Elements from one embodiment may be added to an embodiment. For example, orders of processes described herein may be changed and are not necessarily limited to the manner described herein.

Moreover, the actions of any flow diagram need not be implemented in the order shown; nor do all of the acts necessarily need to be performed. Also, those acts that are not dependent on other acts may be performed in parallel with the other acts.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of handling immersive services at client devices, the method comprising:
   performing, by a first client device of a plurality of client devices, a registration with a network for handling immersive media streams based on feature tags included in a session initiation protocol (SIP) REGISTER request;
   receiving, by the first client device, a SIP REGISTER response from the network;
   identifying, by the first client device, whether the SIP register response includes the feature tags;
   based on identifying that the SIP REGISTER response includes the feature tags, determining, by the first client device, that the network provides a provision for handling of immersive media streams;
   based on determining, by the first client device, that the network provides the provision for handling immersive data streams,
      sending, by the first client device, an SIP INVITE request including the feature tags to a second client device of the plurality of client devices via the network;
      establishing, by the first client device, an immersive call with the second client device based on an acceptance of the SIP INVITE request by the second client device; and
   based on identifying that the SIP REGISTER response does not includes the feature tags, determining, by the first client device, that the network does not provide a provision for handling of immersive media streams.

2. The method as claimed in claim 1, wherein the network comprises one of an internet protocol (IP) multimedia subsystem (IMS) network or a mission critical services (MCX) network.

3. The method as claimed in claim 1, wherein the feature tags include at least one first feature tag and at least one second feature tag and performing the registration with the network comprises:
   including, by the first client device, the at least one first feature tag and the at least one second feature tag in the SIP REGISTER request, wherein the at least one first feature tag is indicative of a type of immersive media streaming supported by the first client device, and wherein the at least one second feature tag is indicative of a type of immersive call service supported by the first client device; and
   sending, by the first client device, the SIP REGISTER request to the network;
   wherein the SIP REGISTER response is indicative of at least one of a successful registration of the first client device with the network based on determining that the network provides the provision for handling immersive data streams or an unsuccessful registration of the first client device with the network based on determining that the network does not provide the provision for handling immersive data streams.

4. The method as claimed in claim 3, wherein the determining that the network provides the provision for the handling of immersive media streams is based on the SIP register response including the at least one first feature tag and the at least one second feature tag.

5. The method as claimed in claim 3, wherein the SIP INVITE request includes feature tags indicative of an intended type of immersive call service for an initiated immersive call by the first client device for making the immersive call with the second client device.

6. The method as claimed in claim 3, wherein a type of immersive call services includes at least one of a hologram call, an extended reality (XR) call including one of a virtual reality (VR) call, or an augmented reality (AR) call by the first client device and the second client device.

7. The method as claimed in claim 3, wherein the at least one first feature tag and the at least one second feature tag include at least one of SIP media tags, IMS communication service identifiers (ICSI), an IMS application reference identifier (IARI) in SIP headers, or a real-time transport protocol (RTP) profile in a session description protocol (SDP).

8. The method as claimed in claim 5, wherein acceptance of the SIP INVITE request is based on the second client device being registered with the network for handling the intended type of immersive call services initiated by the first client device.

9. The method as claimed in claim 3, wherein the SIP REGISTER response indicating the unsuccessful registration does not include the feature tags, and
   the network does not retain the feature tags.

10. The method as claimed in claim 1, further comprising:
    indicating via highlighting a plurality of icons on the first client device upon establishment of the immersive call by the first client device with the second client device for streaming the immersive media streams on a specific external device paired with the second client device.

11. A first client device of a plurality of client devices configured to handle immersive services at client devices, wherein the first client device includes one or more processors configured to:
    perform a registration with a network for handling immersive media streams based on feature tags included in a session initiation protocol (SIP) REGISTER request;
    receive a SIP register response from the network;
    identify whether the SIP register response includes the feature tags;
    based on identifying that the SIP register response includes the feature tags, determine that the network provides a provision for handling of immersive media streams;
    based on determining that the network provides the provision for handling immersive data streams,
       send an SIP INVITE request including the feature tags to a second client device of the plurality of client devices via the network;
       establish an immersive call with the second client device based on an acceptance of the SIP INVITE request by the second client device; and
    based on identifying that the SIP REGISTER response does not includes the feature tags, determine that the network does not provide a provision for handling of immersive media streams.

12. The first client device as claimed in claim 11, wherein the network comprises one of an internet protocol (IP) multimedia subsystem (IMS) network or a mission critical services (MCX) network.

13. The first client device as claimed in claim 11, wherein the feature tags include at least one first feature tag and at least one second feature tag and, for performing the registration with the network for handling immersive media streams, the one or more processors are configured to:
include the at least one first feature tag and the at least one second feature tag in the SIP REGISTER request,
wherein the at least one first feature tag is indicative of a type of immersive media streaming supported as a streaming media type by the first client device, and
wherein the at least one second feature tag is indicative of at least one of a type of immersive call service supported by the first client device; and
send the SIP REGISTER request to the network;
wherein the SIP REGISTER response is indicative of at least one of a successful registration of the first client device with the network based on determining that the network provides the provision for handling immersive data streams or an unsuccessful registration of the first client device with the network based on determining that the network does not provide the provision for handling immersive data streams.

14. The first client device as claimed in claim 13, wherein the determining that the network provides the provision for the handling of immersive media streams is based on the SIP register response including the at least one first feature tag and the at least one second feature tag.

15. The first client device as claimed in claim 13, wherein the SIP INVITE request includes feature tags indicative of an intended type of immersive call service for an initiated immersive call by the first client device for making the immersive call with the second client device.

16. The first client device as claimed in claim 13, wherein a type of immersive call services includes at least one of a hologram call, an extended reality (XR) call including one of a virtual reality (VR) call, or an augmented reality (AR) call by the first client device and the second client device.

17. The first client device as claimed in claim 13, wherein the at least one first feature tag and the at least one second feature tag include at least one of SIP media tags, IMS communication service identifiers (ICSI), an IMS application reference identifier (IARI) in SIP headers, or a real-time transport protocol (RTP) profile in a session description protocol (SDP).

18. The first client device as claimed in claim 15, wherein acceptance of the SIP INVITE request is based on the second client device being registered with the network for handling the intended type of immersive call services initiated by the first client device.

19. The first client device claimed in claim 13, wherein the SIP REGISTER response, indicating the unsuccessful registration does not include the feature tags, and the network does not retain the feature tags.

20. The first client device as claimed in claim 11, wherein the one or more processors is configured to:
indicate via highlighting a plurality of icons on the first client device upon establishment of the immersive call by the first client device with the second client device for streaming the immersive media streams on a specific external device paired with the second client device.

* * * * *